May 26, 1964     M. P. NEIPERT ETAL     3,134,698
DEPOLARIZED PRIMARY CELL
Filed Nov. 18, 1960     2 Sheets-Sheet 1
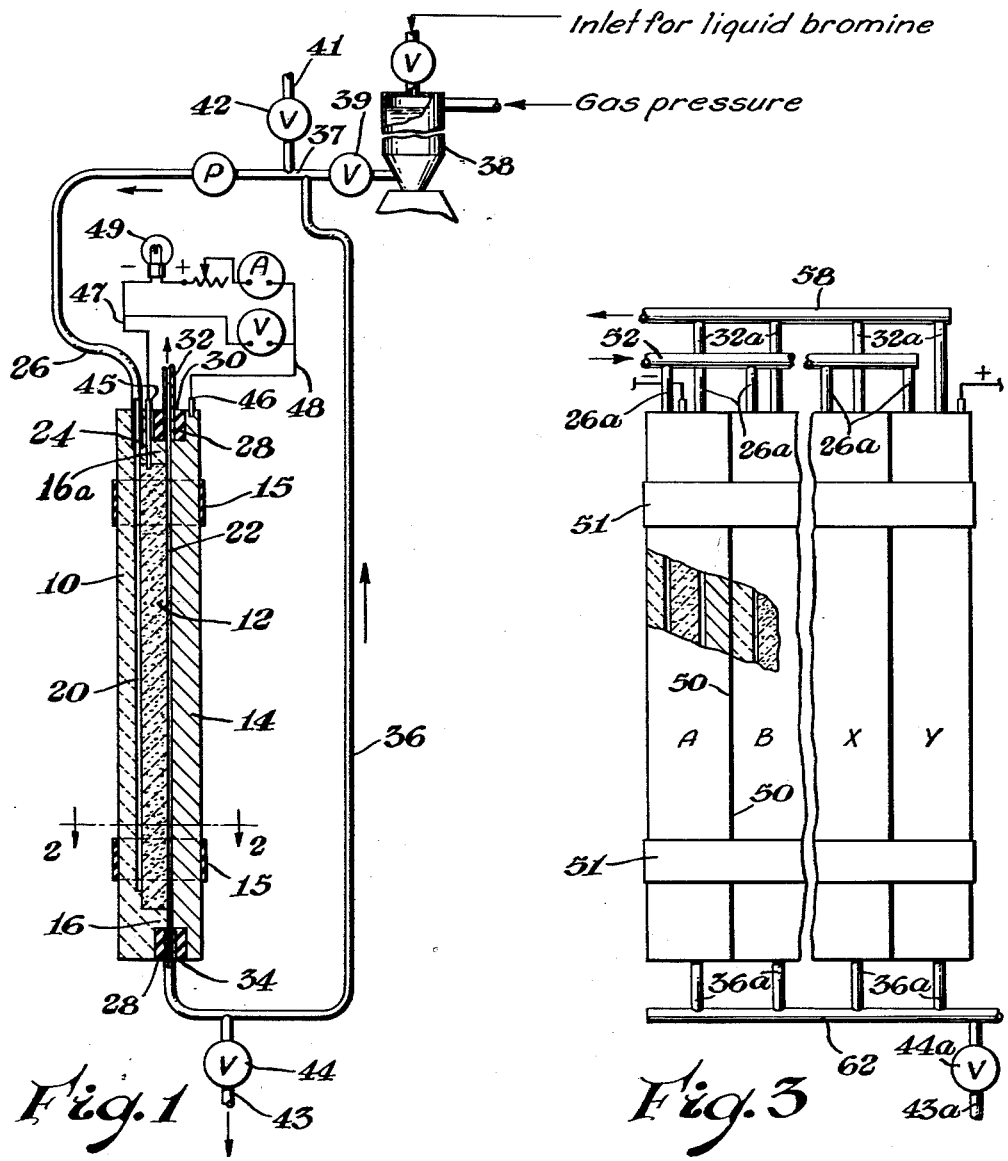
Fig. 1
Fig. 3
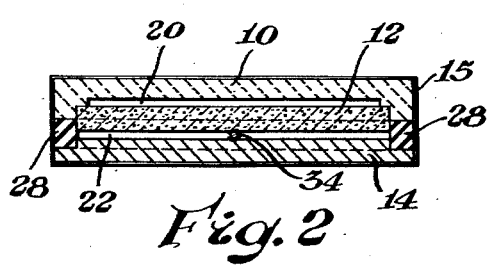
Fig. 2
INVENTORS.
Marshall P. Neipert
Richard E. Carr INVENTORS.
Marshall P. Neipert
Richard E. Carr United States Patent Office 3,134,698
Patented May 26, 1964

3,134,698
DEPOLARIZED PRIMARY CELL
Marshall P. Neipert and Richard E. Carr, both of Midland, Mich., assignors to The Dow Chemical Company, Midland, Mich., a corporation of Delaware
Filed Nov. 18, 1960, Ser. No. 70,312
5 Claims. (Cl. 136—100)

The invention is directed toward the production of electricity by means of a primary cell, i.e., one which converts chemical energy into electrical energy. More especially it is directed toward such cell having an anode of magnesium metal or a magnesium-base alloy and a cathode of porous carbon through which an aqueous electrolyte is passed containing depolarizing materials. By a magnesium-base alloy, as used herein, is meant an alloy consisting of at least about 85 percent by weight magnesium. Hereinafter both magnesium metal and magnesium-base alloy will usually be referred to as magnesium.

Cells for the production of electricity having two electrodes, one with a high positive or oxidizing potential, the anode, and one with a strong negative or reducing potential, the cathode, have long been known. The material most commonly employed in known cells as the anode is zinc, and that most commonly employed as the cathode is carbon, graphite, copper, or platinum.

The surface of the anode, e.g., zinc, oxidizes, i.e., undergoes a positive increase in valence (goes from zero to a higher value). As a result thereof, zinc atoms are converted to zinc ions which enter the electrolyte according to the equation:

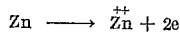

As a result thereof, the anode is dissolved away. The electrons produced by the above reaction travel by way of an external circuit to the cathode and at the interface between the cathode and electrolyte react with the hydrogen ions which migrate thereto through the electrolyte. The reaction at the submerged surface of the cathode or at the interface between the cathode and the electrolyte is regarded essentially as a conversion of the hydrogen ions or of ions containing a hydrogen component such as

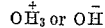

to atomic and/or molecular hydrogen.

When a primary cell continues in operation for any appreciable length of time, an overvoltage tends to develop which is a back electromotive force, i.e., a potential in the reverse direction to that initially present in the electrolytic system. Overvoltage is due to a condition developing in a cell which is referred to generally as polarization.

Polarization may be considered to be due either to depletion of the substances necessary for the occurring electrolytic process at a faster rate than they are being supplied or to the accumulation of the products of the electrolytic process at a faster rate than they are being removed. Polarization in its effect is similar to an ohmic resistance forming part of a circuit and is a condition which must be avoided or overcome to a large extent in primary cells. Among the proposed methods of overcoming the effects of polarization, known as depolarization, are mechanical agitation of the electrolyte, adjustment of current and voltage conditions, and employment of depolarizing agents known generally as depolarizers.

Depolarizers are usually classified as either oxidizing or reducing depolarizers. Oxidizing depolarizers are introduced at the cathode. Among oxidizing depolarizers are chlorine and oxygen which react with the hydrogen values tending to accumulate at the cathode. Reducing depolarizers are introduced at the anode. Among reducing depolarizers are acetylene and inorganic compounds yielding the lower of polyvalent cations such as ferrous, chromous, and vanadous ions.

For uses of electricity in areas not accessible to dynamo-produced electrical energy and which do not lend themselves to utilizing energy produced by gasoline or diesel-powered generators, there is a need for a primary electric cell. For a limited number of such uses, the Leclanché cell has met this need. However, the electrolyte-depolarizer composition of the Leclanché cell renders the ratio of its weight and volume to the power and energy producible therefrom too high for use in compact and mobile cells. The methods heretofore proposed for overcoming the effects of polarization have not adequately overcome such effects and have not lent themselves to depolarizing compact and mobile primary cells having a relatively low ratio of cell weight to the kilowatts and kilowatt hours which the cell is capable of producing. There is, consequently, a need for more effective methods of depolarization, and for methods more adaptable for use in compact low-weight and mobile primary cells and for an improved primary cell containing such depolarizing means.

The invention is predicated on the discovery that elemental bromine is highly soluble in an aqueous solution of magnesium bromide. For example, at room temperature, 660 grams of bromine dissolve per liter of an aqueous solution containing 225 grams of $MgBr_2$ per liter. It is further predicated on the discovery that when an appreciable amount of bromine is dissolved in a $MgBr_2$-containing electrolyte, the electrolyte performs as a depolarizer, because of the existence of tribromide ion, which is formed by reaction of bromine and bromide ion. An adequate supply of the tribromide ion is provided and maintained by continual addition of elemental bromine until the anode is substantially consumed.

The means by which depolarization is attained in a primary cell and a method of generating electricity employing such cell according to the invention are made clear in the following description and annexed drawing and are concisely defined by the appended claims.

The invention, accordingly, is an improved primary cell and method employing such cell for the production of electrical current consisting essentially of introducing elemental bromine into an aqueous electrolyte, containing magnesium bromide in solution, through a porous carbon cathode and thence into contact with an anode of magnesium or magnesium-base alloy.

A convenient way of practicing the invention is to provide an electrolyte recirculating means and a bromine feed means whereby liquid bromine is continuously or intermittently fed into the recirculating electrolyte. However, recirculation is not essential for the practice of the invention and bromine may be added at intervals, or as needed, directly to the electrolyte in the cell.

FIGURE 1 of the drawing is a schematic view of a side elevation, in section, of a cell illustrative of the invention showing the electrodes in a vertical position.

FIGURE 2 is an enlarged horizontal section taken along line 2—2 of FIGURE 1.

FIGURE 3 is a schematic side elevational view of a battery or multiple-cell unit of the invention with parts broken away to show structure.

Figure 4:
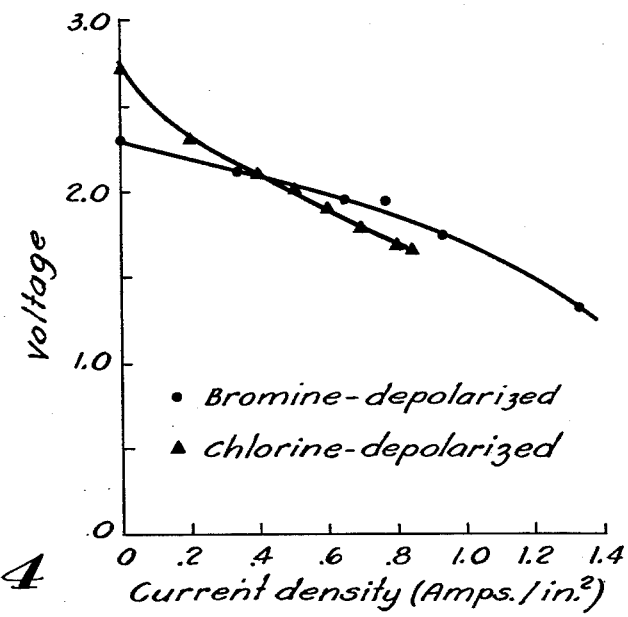
FIGURE 4 is a graph showing contrasting values of current density and voltage and FIGURE 5 is a graph showing contrasting values of current density and power obtained in the practice of the invention on one hand and by the practice of the most efficient primary cell known prior to the invention on the other hand.

Referring to FIGURES 1–3 of the drawing in more detail, there is shown graphite backup plate 10, porous carbon plate 12, and magnesium-base alloy plate 14 in substantially vertical position held firmly together by electrically insulating clamps 15. Graphite backup plate 10 has inwardly extending projections 16 and 16a, which, together with graphite backup plate 10 and porous carbon plate 12, define distributing chamber 20. Graphite backup plate 10 is substantially impervious to the passage of fluids whereas carbon plate 12 readily permits the passage of fluids therethrough. The opposing faces of plates 12 and 14 define electrolytic chamber 22 and are the cathode and anode, respectively, of the electrolytic chamber. The distance between the opposing faces of backup plate 10 and porous cathode 12 is on the order of 0.1 to 0.25 inch. The distance between the opposing faces of cathode 12 and anode 14 can be from 0.05 to 0.5 inch or more but is usually between 0.125 and 0.25 inch in a new cell since close spacing of anode and cathode is preferable to minimize the internal resistance of the cell.

As the cell is used, however, the spacing between the electrodes increases somewhat due to the anode, in contact with the electrolyte, being slowly consumed.

In an opening in the top of projection 16a of backup plate 10 is tapped recess 24 in which feed line 26 is inserted.

Electrically insulating gasket 28 forms a continuous seal all around the cell between projections 16 and 16a on the one hand and anode 14 near the outer edges of the surfaces thereof which face each other and thereby entirely incloses chamber 22 except for tapped opening 30 in the gasket top, into which gas outlet line 32 (primarily for release of $H_2$) is screwed, and tapped opening 34 in the bottom, into which electrolyte outlet line 36 is screwed.

Outlet line 36 conducts electrolyte from the bottom of electrolytic chamber 22 to line 37, leading from brominating means 38 which provides elemental bromine for admixture therein with the electrolyte. Line 37, provided with valve 39, conveys the thus brominated electrolyte to line 26. Pump P, provides a means for recycling the electrolyte and returning it to distributing chamber 20 with sufficient pressure to force the electrolyte through porous cathode 12 into chamber 22 and maintain chamber 22 completely filled during operation. Line 41, having valve 42 therein, provides a controlled means for adding electrolyte to the cell. In line 36, near the outlet of chamber 22 is drain line 43 containing valve 44 for removing electrolyte from the cell, if desired.

Terminal 45 on cathode 12 and terminal 46 on anode 14, to which are attached lead lines 47 and 48, respectively, provide an external circuit for conducting the current produced by the cell. Rheostat R and ammeter A are connected in series in line 48. Voltmeter V is connected in parallel with the ammeter, between lines 47 and 48. A work load is represented by incandescent lamp 49.

Referring to FIGURE 3 of the drawing there is shown a multiple cell unit formed of a number of cells represented by A, B, X and Y, of the type illustrated in FIGURES 1 and 2, abutting one another so that backup plate 10 of one cell is fayed with metal anode 14 of the adjacent cell. Conducting graphite cement 50 is used to form good electrical contact between the abutting electrodes. The so-positioned cells are firmly clamped together as by means of electrically insulating clamps 51. The cells are thereby electrically connected in series. Line 52 supplies electrolyte to feed lines 26a, each of which then carries the electrolyte to the distributing chamber of each of the cells in a similar manner to feed line 26 of the single cell of FIGURE 1. Gas outlet lines 32a lead from each of the cells, in a manner similar to gas outlet line 32 of the single cell, into common line 58 which carries away the hydrogen or other gases produced. Electrolyte outlet lines 36a, each leading from the electrolytic chamber of a cell, in a manner similar to line 36 of the single cell, empty into common discharge line 62. Drain line 43a, having valve 44a therein, serves as a means for removing electrolyte from line 62. Although backup plate 10 is shown of graphite, it may be of any rigid liquid impermeable conducting material and provides electrical contact with cathode 12. The anode is preferably a magnesium-base alloy consisting of between 2 and 8 percent Al, 0.5 to 4 percent Zn, 0.1 to 0.4 percent Mn, and the balance Mg, but it may be any Mg-base alloy containing at least about 85 percent Mg. The cell can be made to operate in any position between vertical and near horizontal, but it is preferred that it be substantially vertical.

The concentration of the $MgBr_2$ in the electrolyte employed is not highly critical. Any concentration between that which conducts electricity sufficiently well to provide an appreciable current and that just short of the saturation point is satisfactory. The range usually employed is between 50 and 350 grams of $MgBr_2$ per liter of electrolyte. When the concentration of $MgBr_2$, due to the dissolution of a magnesium anode during use, tends to exceed the concentration desired, a portion of the electrolyte may be conveniently drawn off, as through drain line 43 by opening valve 44. Additional electrolyte or water may be added through line 41 by opening valve 42. The solubility of elemental bromine therein becomes increasingly higher with increases in the $MgBr_2$ concentration. The solubility of $MgBr_2$ in water is so high, however, that little concern usually need be given to the consideration of $MgBr_2$ in the electrolyte being too high. Since the electrolyte is a substantially pure aqueous $MgBr_2$ solution containing some dissolved elemental bromine, any portion thereof recovered from the cell serves as an excellent bromine source.

In the practice of the invention, as described hereinafter, a cell is used which is provided with a magnesium-base alloy anode, and porous carbon cathode. Liquid bromine is fed into an aqueous $MgBr_2$ electrolyte which enters the cell via a distributing chamber, of the nature of chamber 20 of the drawing. From thence the electrolyte passes through a porous carbon cathode of the nature of that bearing numeral 12 in the drawing, into electrolytic chamber 22 and thence into contact with anode 14, leaves chamber 22 by way of line 36, is brominated by means of brominating assembly 38, and is returned by force of pump P to chamber 20 through line 26. The temperature of the electrolyte is not highly critical. Temperatures of between about 50° and 100° C. may be employed. The higher temperatures appear to contribute to somewhat higher current and power efficiencies but also encourage some foaming and frothing. A few drops of a liquid organic silicone may be added to inhibit foaming. Temperatures of between about 75° and 90° C. are usually employed.

Hydrogen, which is produced in the cell, ordinarily tends to accumulate at the cathode according to the reactions expressed by the equations:

Such accumulation tends to polarize the cathode. However, in accordance with the invention, the tribromide ions serve as an effective depolarizing agent by reacting with a large proportion of the hydrogen. Although the tribromide ions actually perform as the direct depolarizer in the invention, elemental bromine is essential since its presence forms the tribromide ions. Thus, for ease of expression, the cell of the invention may be referred to as a bromine-depolarized cell. Similarly, a known cell employing elemental chlorine to perform indirectly the function of depolarization, may be referred to as a chlorine-depolarized cell.

Although soluble bromide salts other than $MgBr_2$ e.g., NaBr of KBr, may be employed in the practice of the invention in the start-up electrolyte, $MgBr_2$, which is subsequently produced, tends to force the other less soluble salts out of solution, due largely to its higher solubility.

In practicing the invention employing a battery of the type shown in FIGURE 3, the procedure is little different from that employing one cell of the type shown in FIGURE 1. When employing the battery, the cells are placed in firm contact in electrical series. One method of attaining this is to employ a conducting cement between adjacent cells as afore suggested. A cement which can be employed for this purpose is one consisting of at least 50 percent battery-grade powdered graphite containing a bonding material. An example of such a cement is one consisting of 24 percent beeswax, 24 percent rosin, 2 percent gilsonite, and 50 percent of the graphite powder. The cells may also be firmly pressed together to make good electrical contact and sealed at the edges with a good bonding cement, e.g., Saran cement or an epoxy resin. Other ways of making electrical contact are to force a copper metal sheath between the cells, connect the cells by graphite pins or short copper wires or bus bars, or spray copper metal on graphite or carbon connections.

The following examples illustrate modes of practicing the invention:

EXAMPLES 1-6

*Series 1.*—A cell of the type shown in FIGURE 1, having an anode and a cathode with areas of 32.4 square inches each, and a ⅜ inch thick backup plate, represented by numeral 10 of the drawing, was assembled. The cathode was of a standard grade porous carbon processed from the National Carbon Company. Cathode 12 was made secure in projection 16 of graphite plate 10. The anode was a magnesium-base alloy designated AZ31 composed of about 3 percent Al, 1 percent Zn, 0.2 percent Mn, and the balance Mg. The anode was spaced ¼ inch away from the cathode. The start-up electrolyte was an aqueous solution containing 150 grams of $MgBr_2$ per liter to which were admixed a few drops of Dow-Corning Anti-Foam A. The bromide-containing electrolyte was caused to circulate at a rate of 40 cc./minute through the cell and return line, as herein above described, and sufficient elemental bromine added thereto to provide 186 grams thereof per liter of electrolyte.

Conducting wires, as represented by numerals 47 and 48, were attached to the terminals of the cathode and anode of the cell. Rheostat R was placed in line 48 for controlling the current and voltage as desired. An external circuit was then completed by placing ammeter A in series with the rheostat for measurement of current. Voltmeter V was placed in parallel with the ammeter for measuring closed circuit voltage. Examples 1 to 6 were each conducted in substantially the same manner except that the rheostat setting was varied in each example to obtain different voltage and amperage values. Table I set out below shows the values obtained for current density, flow of electricity through the outside circuit, voltages and temperature obtained at substantially simultaneously readings as soon as equilibrium conditions had been established following each rheostat change. The current density was calculated by dividing the current flow in amperes through the electrolyte by the area of the anode face in contact with the electrolyte. (Since the area of the opposing faces of the cathode and the anode were the same, the current density values would have been the same whether based upon the anode or the cathode.)

*Table I*

| Example Number | Time in Minutes | Current in Amperes | Current Density in amperes/in.² | Voltage in volts | Temperature in °C |
|---|---|---|---|---|---|
| 1 | 28 | 25.0 | 0.77 | 1.96 | 77 |
| 2 | 7 | 30.0 | 0.93 | 1.76 | 85 |
| 3 | 4 | 43.0 | 1.33 | 1.32 | 88 |
| 4 | 3 | 21.0 | 0.65 | 1.96 | 83 |
| 5 | 2 | 11.0 | 0.34 | 2.12 | 82 |
| 6 | 4 | 41.0 | 1.25 | 1.22 | 90 |
|  | ¹ 48 | ² 26.3 |  |  |  |

¹ Total
² Average.

Reference to Table I shows that relatively high amperage was obtained while maintaining an appreciable voltage. Since amperes $x$ volts=watts, or power, it is apparent that a desirably high power value is obtained in the practice of the invention.

*Series 2.*—A series of runs was made for the purpose of contrasting a primary cell illustrative of the invention with a known cell which represents a recent advancement in primary cells. Such cell is described in detail in U.S. application, S.N. 722,746, filed March 20, 1958, now U.S. Patent No. 3,019,279, of which one of the inventors is a co-inventor of the instant invention.

The cell employed for the contrasting runs resembled the cell employed to illustrate the practice of the invention in a number of respects but differed in the following respects:

In the contrasting runs, in accordance with S.N. 722,746, now U.S. Patent No. 3,019,279: chlorine was employed as the agent to effect depolarizataion. The chlorine was provided by a steel bottle in which it was maintained under high pressure and was fed into the electrolyte in an amount sufficient to maintain a controlled oxidizing normality of about 0.6 N. The start-up electrolyte contained about 3 percent NaCl and sufficient NaBr to maintain the oxidizing normality of 0.6 N. The pH was carefully maintained at a value of between 2 and 3 by the addition of $H_2SO_4$. The circulation of electrolyte was at the high rate of between 400 and 500 cc./minute. The electrodes each had an area of 60 square inches on each face.

In the runs illustrative of the invention, liquid bromine was bled into the electrolyte at a pressure only slightly greater than the pressure in the circulating line provided by pump P, as shown in the drawing. The start-up electrolyte was an aqueous solution of $MgBr_2$, containing about 186 grams bromine per liter. The rate of circulation was 40 cc./minute. No measurement of the oxidizing normality of the bromine concentration nor of the pH were taken, since such values are not critical in the practice of the invention. The electrodes each had an area of 32.4 square inches on each face.

In the contrasting runs, according to S.N. 722,746, now U.S. Patent No. 3,019,279, as well as in the runs according to the invention, changes in voltage and amperage were made by adjustment of the settings of rheostat R. Readings were taken on voltmeter V and ammeter A and current flow through the electrolyte ascertained after each rheostat adjustment when substantially equilibrium conditions had been established. The current through the electrolyte was converted to current density by dividing the area, in square inches, of the anode, exposed to the electrolyte. Power values were obtained for runs both in accordance with the invention and according to S.N. 722,746, now U.S. Patent No. 3,019,279, per unit area of the anode by the following formula:

$$\frac{\text{Amperes} \times \text{volts}}{\text{Area in sq. inches}} = \text{watts per sq. inch}$$

The values obtained are set further in Table II below. The relationship of voltage to current density in amperes per square inch of anode in contact with the electrolyte is shown graphically in FIGURE 4. The relationship of watts per square inch of anode in contact with the electrolyte to current density in amperes per square inch thereof is shown graphically in FIGURE 5.

*Table II*

Chlorine-Depolarized Cell

| Current Density in ampere/in.² | Volts | Power in Watts/in.² |
|---|---|---|
| 0.00 | 2.72 | 0.00 |
| 0.20 | 2.31 | 0.46 |
| 0.40 | 2.11 | 0.84 |
| 0.50 | 2.01 | 1.01 |
| 0.60 | 1.91 | 1.15 |
| 0.70 | 1.82 | 1.27 |
| 0.80 | 1.71 | 1.37 |
| 0.84 | 1.68 | 1.41 |
| 0.90 | 1.61 | 1.45 |
| 1.00 | 1.49 | 1.49 |
| 1.10 | 1.35 | 1.49 |
| 1.20 | 1.22 | 1.46 |

BROMINE-DEPOLARIZED CELL

| | | |
|---|---|---|
| 0.00 | 2.29 | 0.00 |
| 0.20 | 2.20 | 0.44 |
| 0.34 | 2.12 | 0.72 |
| 0.50 | 2.04 | 1.02 |
| 0.65 | 1.96 | 1.27 |
| 0.77 | 1.96 | 1.51 |
| 0.93 | 1.76 | 1.64 |
| 1.05 | 1.66 | 1.74 |
| 1.20 | 1.50 | 1.80 |
| 1.33 | 1.32 | 1.76 |
| 1.40 | 1.18 | 1.65 |

Figure 5:
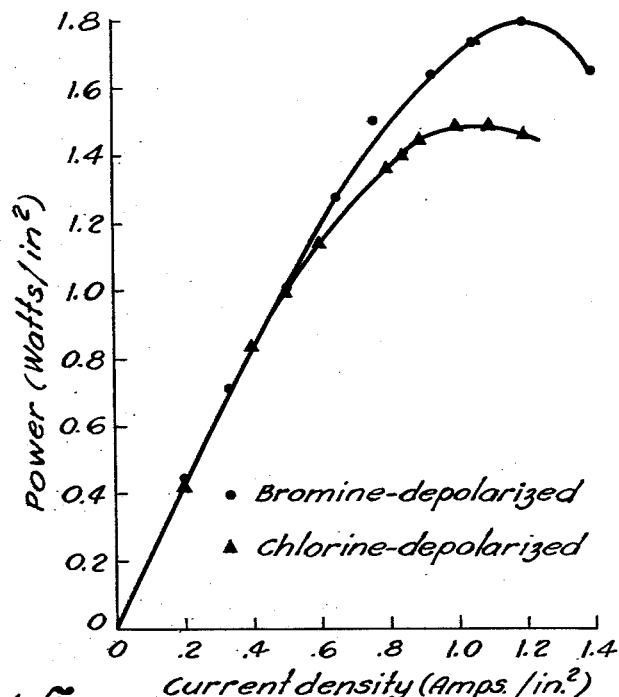

Reference to Table II and to FIGURES 4 and 5 shows a number of advantages of the invention over the system of S.N. 722,746, now U.S. Patent No. 3,019,279, wherein chlorine is employed. In FIGURE 4 it can be seen that, at a current density of 0.4 ampere and higher per square inch of anode area, the voltage is substantially greater in the cell of the invention wherein liquid bromine is employed for depolarization. In FIGURE 5 it can be seen that when a current density of 0.5 ampere and higher per square inch exists, the power, measured in watts per square inch, is substantially greater in the cell of the invention employing liquid bromine for depolarization. It can also be seen from FIGURE 5 that the highest power value is obtained at a current density of 1.2 amperes per square inch whereas the higher power value is obtained in the cell employing chlorine at only 1.1 amperes per square inch. It can further be seen in FIGURE 5 that the maximum watts per square inch obtained according to the invention was 1.8, whereas the highest power value obtained when chlorine was employed was only 1.49 watts per square inch. This power value represents over 20 percent more power employing the cell of the invention than when employing chlorine for depolarization of the cell.

Other advantages to be realized from the practice of the invention are: heavy steel container to supply chlorine under pressure is dispensed with. The high concentration of liquid bromine in the MgBr₂-containing electrolyte reduced the volume of the electrolyte needed. The employment of liquid bromine is safer and more convenient than chlorine. The recirculation of the electrolyte need not be provided, or when provided, as in the preferred practice of the invention, the rate of circulation is relatively low in contrast to the high rate required when chlorine is employed. The close control of the $MgCl_2$ concentration, of the oxidizing normality, and of the pH which is required in the operation of the cell employing chlorine for depolarization need not be observed in the practice of the invention since these values are not critical.

Having described the invention, what is claimed and desired to be protected by Letters Patent is:

1. A primary cell consisting of a metal anode composed of at least about 85 percent magnesium, and, electrically separated therefrom a distance of between about 0.05 and 0.5 inch, a porous carbon cathode defining an electrolytic chamber therebetween; an electrolyte comprising an aqueous solution of $MgBr_2$; a substantially impervious plate positioned between about 0.1 and about 0.25 inch exterior to and parallel to said cathode defining a distributing chamber between the cathode and said plate; conduit means for admission of electrolyte in said distributing chamber; an outlet into the upper part of said electrolytic chamber for escape of gases; an outlet in the lower part of said electrolytic chamber for egress of electrolyte; a recirculating line leading from said outlet for electrolyte; a means for injecting elemental bromine into said recirculating line; a means for providing pressure for recirculation of said electrolyte; and means for introducing the thus brominated electrolyte into said distributing chamber.

2. The cell of claim 1, wherein the metal anode is composed of between 2 and 8 percent aluminum, between 0.5 and 4 percent zinc, between 0.1 and 0.4 percent manganese, and the balance essentially magnesium.

3. The method of producing electricity comprising brominating a $MgBr_2$-containing aqueous solution by introducing gaseous bromine into a $MgBr_2$ solution, passing said solution thus brominated through a porous carbon cathode into contact with a metal anode spaced apart from said cathode 0.05 to 0.5 inch, said anode being composed of at least about 85% by weight of magnesium and connected to said carbon cathode through an external solid conductor and a resistance to produce thereby direct current.

4. The method of producing electricity which comprises admixing $MgBr_2$ in an aqueous solution to make a $MgBr_2$-containing brine, adding elemental bromine to said $MgBr_2$-containing brine, passing said brine thus brominated through a porous carbon plate into contact with a magnesium-base alloy plate spaced apart from said carbon plate 0.05 to 0.5 inch and connected to said carbon plate through an external circuit including a resistance to produce thereby direct current, and drawing off said brine from contact with said magnesium alloy plate, rebrominating the brine thus drawn off, and continuing to introduce the brominated brine into said distributing chamber.

5. A primary cell consisting of a metal anode composed of at least about 85% by weight magnesium, and, electrically separated inwardly, between about 0.05 and about 0.5 inch therefrom, a porous carbon cathode defining an electrolytic chamber therebetween, said anode and cathode each having a broad face disposed opposite each other; a substantially impervious plate positioned between about 0.1 and about 0.25 inch exterior to and substantially parallel to said cathode to define a distributing chamber for an electrolyte as admitted into the cell; a means for supplying a magnesium bromide-containing electrolyte; a means for injecting elemental bromine into the electrolyte prior to its admission into said distributing chamber; a means for admission of the magnesium bromide-containing electrolyte containing the elemental bromine into said distributing chamber; an outlet for gases at the top of said electrolytic chamber; and an outlet for electrolyte from the bottom of said electrolytic chamber.

References Cited in the file of this patent

UNITED STATES PATENTS

| 898,055 | MacMillan | Sept. 8, 1908 |
| 2,712,564 | Fry | July 5, 1955 |
| 2,715,653 | Reid | Aug. 16, 1955 |
| 2,874,204 | Morehouse et al. | Feb. 17, 1959 |
| 3,019,279 | Blue et al. | Jan. 30, 1962 |

FOREIGN PATENTS

| 203,024 | Germany | Sept. 26, 1908 |